(12) United States Patent
Miyajima et al.

(10) Patent No.: US 7,715,693 B2
(45) Date of Patent: May 11, 2010

(54) CONTROL APPARATUS AND CONTROL METHOD

(75) Inventors: Yasushi Miyajima, Kanagawa (JP); Kosei Yamashita, Kanagawa (JP); Motoyuki Takai, Tokyo (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1123 days.

(21) Appl. No.: 11/337,952

(22) Filed: Jan. 23, 2006

(65) Prior Publication Data

US 2006/0200847 A1    Sep. 7, 2006

(30) Foreign Application Priority Data

Jan. 21, 2005  (JP)  ............................ P2005-013737

(51) Int. Cl.
*H04N 7/00* (2006.01)
*H04N 7/173* (2006.01)
*G06F 3/00* (2006.01)

(52) U.S. Cl. .................... 386/96; 386/98; 719/322; 725/88; 725/89

(58) Field of Classification Search .............. 386/96, 386/98, E5.022, E5.034; 348/E7.061; 719/322; 725/88, 89

See application file for complete search history.

(56) References Cited

U.S. PATENT DOCUMENTS

2003/0133700 A1*  7/2003  Uehara .................. 386/96

FOREIGN PATENT DOCUMENTS

| JP | 2004-029324 A | 1/2004 |
|----|---------------|--------|
| JP | 2004-127019 A | 4/2004 |

\* cited by examiner

*Primary Examiner*—Thai Tran
*Assistant Examiner*—Syed Y Hasan
(74) *Attorney, Agent, or Firm*—Wolf, Greenfield & Sacks, P.C.

(57) ABSTRACT

A control apparatus for controlling an event in accordance with the playback of playback data includes a playback processor performing playback processing on the playback data, an acquisition unit acquiring playback section information associated with the playback data to specify a target playback section of the playback data, an end time point specifying unit specifying an end time point of the event in relation to the playback data on the basis of the playback section information, a time period specifying unit specifying a time period from the start to the end of the event, a start time point specifying unit specifying a start time point of the event on the basis of the end time point and the time period, and a controller controlling the event to be started at the start time point of the event by monitoring a playback status of the playback data.

19 Claims, 6 Drawing Sheets

CONTROL APPARATUS AND CONTROL METHOD

CROSS REFERENCES TO RELATED APPLICATIONS

The present invention contains subject matter related to Japanese Patent Application JP 2005-013737 filed in the Japanese Patent Office on Jan. 21, 2005, the entire contents of which are incorporated herein by reference.

BACKGROUND OF THE INVENTION

1. Field of the Invention

The present invention relates to an apparatus and method in which, in accordance with main content, such as sound, an image, or a motion of an object, to be played back or acted, another content, such as sound, an image, or a motion of an object, can be played back or acted with a certain relationship with the main content.

2. Description of the Related Art

Sound playback-only devices, such as compact-disc (CD) players and mini-disk (MD) players, are widely used. In recent years, however, composite (multiple-function) machines, such as personal computers, digital versatile disc (DVD) players, hard disk recorders, that can process both sound data and video data, are also coming into wide use, which increases the opportunity to play back music in such a composite machine by connecting a monitor receiver, such as a television receiver, to the composite machine. Accordingly, there is an increasing demand for displaying appropriate images on a connected monitor receiver while music is being played back.

To address such a demand, a so-called visualizer is currently used. More specifically, while playing back sound data, the spectrum of sound data is analyzed. Then, based on the analysis results and information concerning the volume of the sound data, geometric patterns are generated in real time while the sound data is being played back, and are displayed on the display screen of a monitor receiver.

For example, Japanese Unexamined Patent Application Publication No. 2001-092434 discloses an information processing apparatus (visualizer) for displaying images in association with sound. In this image processing apparatus, an image to be displayed can be switched in response with a sound change, and a method for generating a synthesized image from a frequency analyzed image and a selected image can also be switched in response with a sound change. By using the technique disclosed in this publication, images can be presented to users by being associated with sound.

SUMMARY OF THE INVENTION

In known visualizers, as stated above, geometric patterns are generated based on analysis results of sound data spectra or volume information. It is however difficult to create visually interesting, diversified representations. Additionally, it is not possible to start analyzing sound data until it is read, and thus, it is difficult to create representations that have to be prepared in advance.

It is possible to take time to record or generate video data in advance at a time different from sound data, and then to integrate the video data into the sound data as if the video data and the sound data were recorded or generated at the same time. For example, it is a common practice to integrate images generated by computer graphics into music so that the images can be played back simultaneously with music.

However, it is almost impossible to create a representation such that an object moving according to a natural law is controlled in advance to cause the object to collide with another object in synchronization with a desired sound-data playback time. It is thus difficult to play back sound and images in real time with a certain relationship in such a manner that users can understand.

It is thus desirable to provide an apparatus and method in which various events requiring a certain time period to finish can be played back or acted by synchronizing the end points of the events with a predetermined playback point of main content, such as sound, an image, or a motion of an object.

According to an embodiment of the present invention, there is provided a control apparatus for controlling an event represented by at least one of sound, an image, or a motion of an object in accordance with a playback operation of playback data. The control apparatus includes playback processing means for performing playback processing on the playback data, acquisition means for acquiring playback section information for specifying a target playback section of the playback data, the playback section information being provided in association with the playback data, end time point specifying means for specifying an end time point of the event in relation to the playback data on the basis of the playback section information acquired by the acquisition means, time period specifying means for specifying a time period from the start to the end of the event, start time point specifying means for specifying a start time point of the event on the basis of the end time point specified by the end time point specifying means and the time period from the start to the end of the event specified by the time period specifying means, and control means for controlling the event to be started at the start time point of the event specified by the start time point specifying means by monitoring a playback status of the playback data.

According to another embodiment of the present invention, there is provided a control apparatus for controlling an event represented by at least one of sound, an image, and a motion of an object in accordance with an operation status of a target object. The control apparatus includes drive means for driving the target object, acquisition means for acquiring operation section information for specifying a target operation section of the target object, the operation section information being provided in association with a series of operations of the target object, end time point specifying means for specifying an end time point of the event in relation to the series of operations of the target object on the basis of the operation section information acquired by the acquisition means, time period specifying means for specifying a time period from the start to the end of the event, start time point specifying means for specifying a start time point of the event on the basis of the end time point specified by the end time point specifying means and the time period from the start to the end of the event specified by the time period specifying means, and control means for controlling the event to be started at the start time point specified by the start time point specifying means by monitoring the operation status of the target object.

According to another embodiment of the present invention, there is provided a control method for controlling an event represented by at least one of sound, an image, or a motion of an object in accordance with a playback operation of playback data, including the steps of performing playback processing on the playback data, acquiring playback section information for specifying a target playback section of the playback data, the playback section information being provided in association with the playback data, specifying an end time point of the event in relation to the playback data on the basis of the acquired playback section information, specifying a time period from the start to the end of the event, specifying a start time point of the event on the basis of the specified end time point and the specified time period from the start to the end of the event, and controlling the event to be started at the specified start time point of the event by monitoring a playback status of the playback data.

According to another embodiment of the present invention, there is provided a control method for controlling an event represented by at least one of sound, an image, and a motion of an object in accordance with an operation status of a target object, including the steps of driving the target object, acquiring operation section information for specifying a target operation section of the target object, the operation section information being provided in association with a series of operations of the target object, specifying an end time point of the event in relation to the series of operations of the target object on the basis of the acquired operation section information, specifying a time period from a start to an end of the event, specifying a start time point of the event on the basis of the specified end time point and the specified time period from the start to the end of the event, and controlling the event to be started at the specified start time point by monitoring the operation status of the target object.

Accordingly, when playing back main content, such as music, video images, or a motion of an object, another sound, video image, motion of an object can be synchronized with a predetermined position of the main content data. As a result, content can be provided in a novel manner by using existing content, i.e., new entertainment can be provided.

A series of events, which are difficult to be represented by a visualizer for generating information only from a sound signal for a short time around the playback time position or by a moving toy which moves in accordance with music, can be represented by sound, images, or a physical motion of an object, thereby providing diversified, interesting representations to the user.

DESCRIPTION OF THE PREFERRED EMBODIMENTS

An embodiment of an apparatus and method of the present invention is described below with reference to the accompanying drawings.

Figure 1:
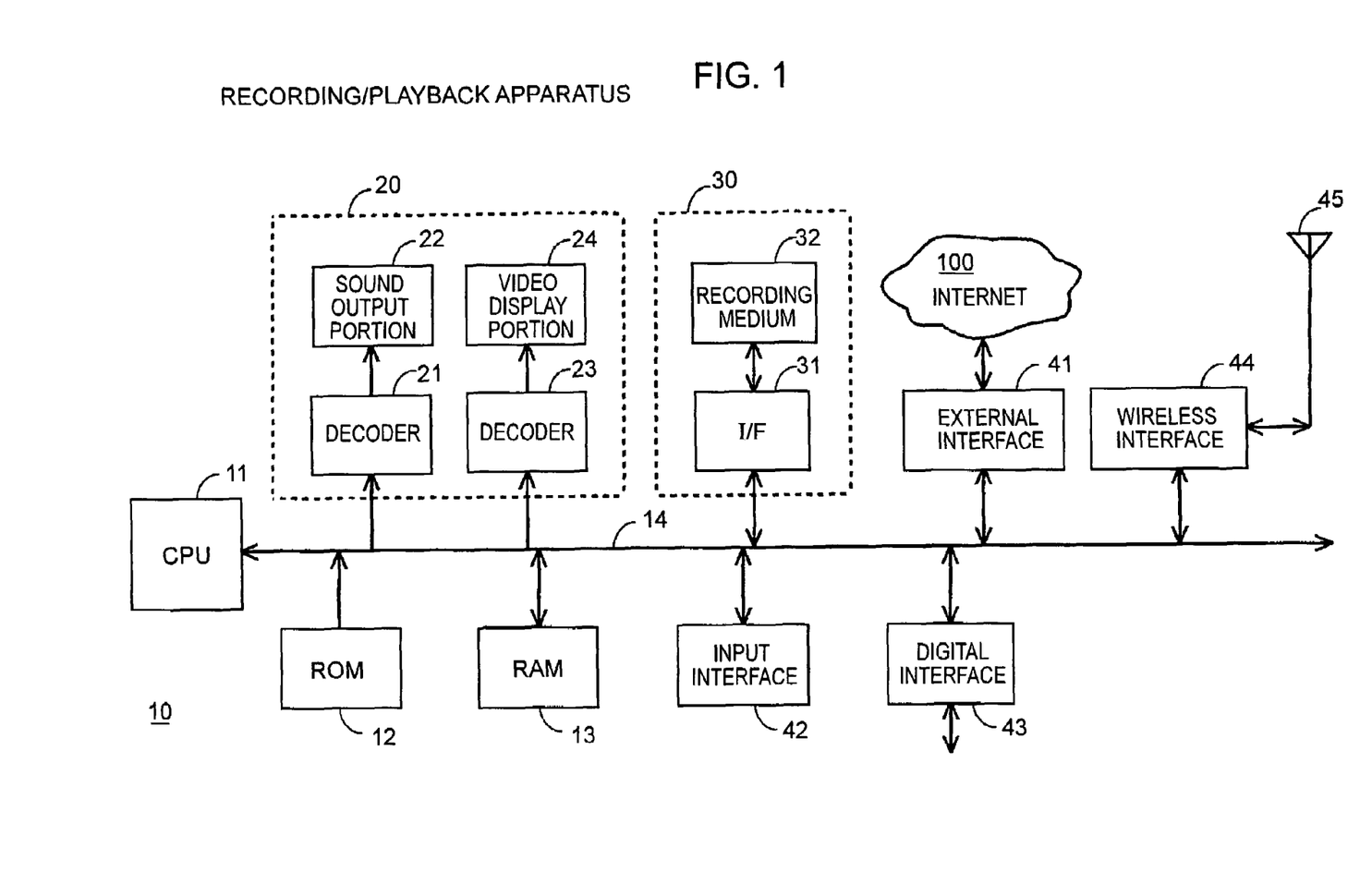
FIG. 1 is a block diagram illustrating a recording/playback apparatus according to an embodiment of the present invention.

FIG. 1 illustrates a recording/playback apparatus according to an embodiment of the present invention. The recording/playback apparatus includes a controller 10, an output unit 20, a storage unit 30, an external interface 41, an input interface 42, a digital interface 43, a wireless interface 44, and a transmission/reception antenna 45.

The controller 10 is a microcomputer including a central processing unit (CPU) 11, a read only memory (ROM) 12, and a random access memory (RAM) 13 connected to each other through a CPU bus 14. The controller 10 controls the individual elements of the recording/playback apparatus.

The output unit 20 includes a sound decoder 21, a sound output portion 22, a video decoder 23, and a video display portion 24. The sound output portion 22 is a speaker, and the video display portion 24 is a display device, such as a liquid crystal display (LCD), a plasma display panel (PDP), an organic electroluminescence (EL) display, or a cathode ray tube (CRT). The sound decoder 21 generates an analog audio signal from sound data to be played back and supplies the generated signal to the sound output portion 22. The video decoder 23 generates an analog video signal from video data to be played back and supplies the generated signal to the video display portion 24.

The storage unit 30 includes an interface 31 and a recording medium 32. As the recording medium 32, a hard disk, an optical disc, a magneto-optical disk, a semiconductor memory, or a flexible disk, may be used.

As the recording medium 32, a plurality of recording media of the same type, such as a plurality of hard disks or a plurality of optical discs, may be used. Alternatively, a plurality of recording media of different types, such as a hard disk and an optical disc or an optical disc and a magneto-optical disk may be used. It is now assumed that a hard disk is used as the recording medium 32 in this embodiment.

As discussed below, the recording medium 32 stores content data to be played back, such as sound data, video data, audiovisual (AV) data, text data, and other types of data. The AV data is a combination of video data and sound data to be played back in synchronization with each other. The recording medium 32 also stores various metadata associated with individual content data.

Various metadata associated with individual content data include information concerning delimiting positions or timing positions of content data, for example, if content data is sound data, metadata is data indicating delimiting positions of individual bars or data indicating the start time point and the end time point of the performance of a predetermined musical instrument. Details of metadata are given below.

Metadata may be provided by accompanying the associated content data. Alternatively, metadata associated with only target content data may be obtained, separately from content data, via various recording media or networks, such as the Internet. Content data and metadata are associated with each other by predetermined identification information attached to the corresponding content data.

In the recording/playback apparatus of this embodiment, the external interface 41 is used for connecting the recording/playback apparatus to the Internet 100. Accordingly, the recording/playback apparatus can download sound content data, video content data, AV content data, text data, metadata associated with the corresponding content data, and other data from the Internet 100 and stores the downloaded data in the recording medium 32 via the interface 31. Conversely, the recording/playback apparatus can send information to a target server and stores it in the server.

The input interface 42 is a key operation unit for receiving the input of an operation from a user. Information indicating the operation input through the input interface 42 is converted into an electric signal and is supplied to the controller 10. Then, the controller 10 can control the individual elements of the recording/playback apparatus in response to the operation input from the user.

The digital interface 43 is, for example, an Institute of Electrical and Electronic Engineers (IEEE)-1394 interface, a universal serial bus (USB) interface, or another type of digital interface. The digital interface 43 is connected to another electronic device via a dedicated line to send or receive, for example, content data and associated metadata.

The wireless interface 44 and the transmission/reception antenna 45 are connected to, for example, a wireless local area network (LAN), to send and receive information to and from the wireless LAN. The recording/playback apparatus can receive content data or associated metadata from a wireless LAN system via the wireless interface 44 and the transmission/reception antenna 45.

In the recording/playback apparatus, as stated above, content data or associated metadata supplied via the Internet 100 and the external interface 41, the wireless interface 44, or the digital interface 43 is recorded on the recording medium 32 via the interface 31.

The content data recorded on the recording medium 32 as described above can be used in the recording/playback apparatus. If the content data is, for example, sound data, video data, or AV data, it is read from the recording medium 32 in response to an instruction to play back the content data via the input interface 42, and is decoded in the decoder 21 or 23 of the output unit 20. The decoded data is then played back via the sound output portion 22 or the video display portion 24 and is provided to the user. If the content data is a program, it can be executed in the controller 10.

When playing back and outputting content data, such as sound data, recorded on the recording medium 32, the controller 10 generates computer graphic images representing an object which moves according to a predetermined relationship, for example, a physical law, and provides the generated computer graphic images to the user via the video display portion 24.

In this case, computer graphic images created by the controller 10 are not those created in advance and then played back in synchronization with sound data, but computer graphic images created in real time so that a predetermined event (target event) represented by those computer graphic images can be ended in synchronization with a predetermined playback time of sound data. In this specification, "events" mean subjects that can be observed, including video images, sound, and physical motion of objects.

More specifically, it is now assumed that computer graphic images representing an event in which a ball thrown and passing while describing a parabola hits a cymbal of a drum are generated and displayed in accordance with sound data to be played back. In this case, a cymbal sound is played back the instant the ball hits the cymbal. In this manner, the computer graphic images are generated and displayed before the target playback time of the sound data so that the predetermined event represented by the computer graphic images is completed at the target playback time of the sound data.

To generate and display computer graphic images as described above, the period required for the event represented by the computer graphic images, i.e., the time from when the ball is thrown to when it hits the cymbal, is calculated to precisely specify the time when the generation of the computer graphic images is started before the target playback time of the sound data. Then, the processing for generating and displaying the computer graphic images is started based on the specified playback time relative to the target playback time of the sound data.

To specify the target playback section of the sound data, metadata associated with the sound data is used. As stated above, the metadata associated with the sound data includes data indicating delimiting positions of bars or data indicating the start time point and the end time point of the performance of a predetermined musical instrument. The use of metadata makes it possible to provide synchronization of the output of sound with the output of the computer graphic images so that the event represented by the computer graphic images can be ended at the playback start time of the performance of the predetermined musical instrument.

That is, if there are a series of computer graphic images (moving pictures) to be displayed in accordance with the playback operation of sound data, the controller 10 first reads the sound data to be played back from the recording medium 32 and plays it back via the decoder 21 and the sound output portion 22 and also reads metadata associated with the sound data.

Then, based on the read metadata, the controller 10 specifies the end time of the event represented by the computer graphic images and also specifies the period from the start to the end of the event. Based on the specified time and period, the controller 10 specifies the start time of the event represented by the computer graphic images, i.e., the time when processing for generating and displaying the computer graphic images is started.

Then, by monitoring the playback status of the sound data to be played back from the output unit 20, the controller 10 starts generating the computer graphic images from the specified start time and then outputs and provides the generated computer graphic images to the user via the decoder 23 and the video display portion 24. That is, the controller 10 can generate and display the computer graphic images in accordance with the playback operation of the sound data so that the event represented by the computer graphic images can be ended at the predetermined timing (specified end time) of the sound data.

As described above, in the recording/playback apparatus of this embodiment, the output unit 20 implements a function serving as playback processing means for playing back content data, such as sound data, audio data, or AV data, and the controller 10 implements a function serving as specifying means for reading metadata to specify the end time of an event represented by computer graphic images, the period from the start to the end of the event, and the start time of the event, and also implements a function serving as control means for controlling the event to be presented to the user.

If metadata is recorded on the recording medium 32, the interface 31 and the controller 10 implement a function serving as acquisition means for acquiring the metadata. If metadata is obtained via the Internet 100, the external interface 41 and the controller 10 implement a function serving as the acquisition means. If metadata is obtained via a wireless LAN, the transmission/reception antenna 45 and the wireless interface 44, and the controller 10 implement the acquisition means. If metadata is obtained from an external device via the digital interface 43, the digital interface 43 and the controller 10 implement a function serving as the acquisition means.

Specific examples of control processing for an event (target event) represented by video data, sound data, or a motion of an object in accordance with the playback operation of content data, such as sound data, are discussed in detail below.

Figure 2:
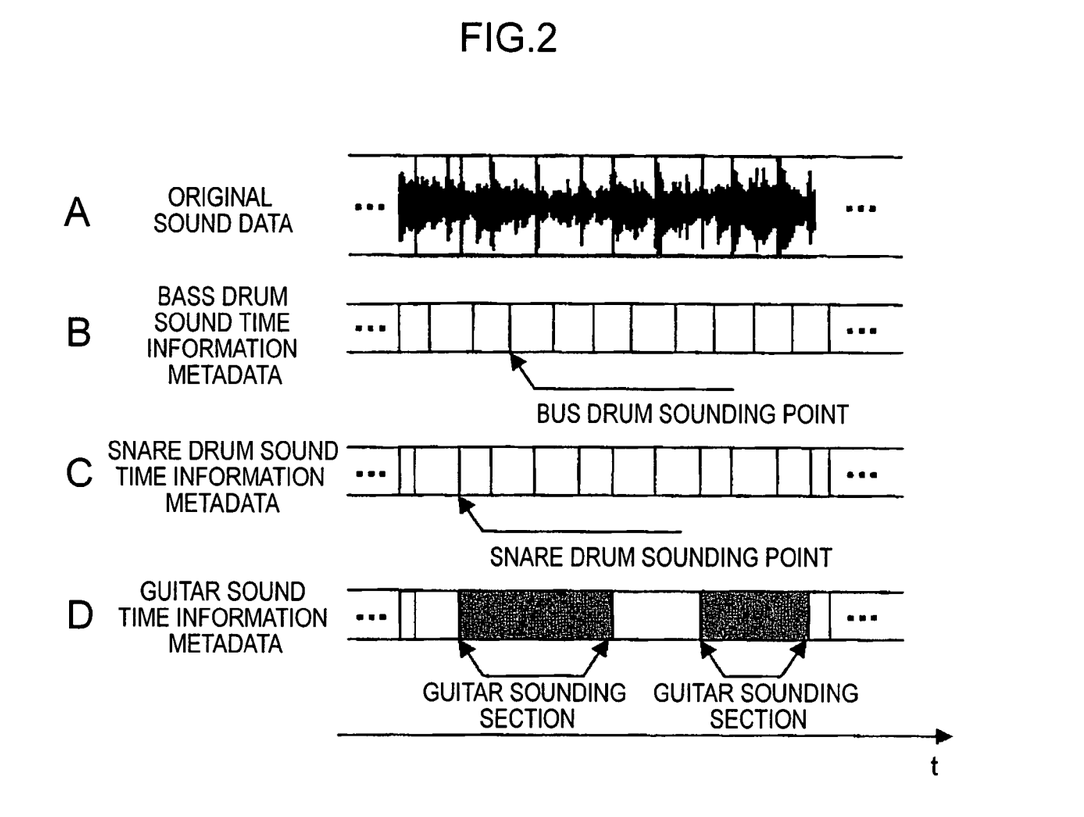
FIG. 2 illustrates an example of sound data and an example of metadata associated with the sound data.

Specific examples of sound data and metadata are described below, assuming that content data to be played back is mainly sound data. FIG. 2 illustrates an example of sound data that can be used in the recording/playback apparatus of this embodiment and an example of metadata associated with the sound data. In FIG. 2, A indicates a waveform diagram illustrating the sound data (original sound data), which is the content data to be recorded on the recording medium 32 and to be played back.

In FIG. 2, B, C, and D represent metadata corresponding to the sound data indicated by A. B designates metadata representing the time points at which a bus drum sound is started (sounding points). Vertical lines shown in B indicate the time points at which a bus drum sound is started.

Similarly, C designates metadata representing the time points at which a snare drum sound is started (sounding points). Vertical lines shown in C indicate the time points at which a snare drum sound is started. D designates a guitar sounding section (from a sounding point to a mute point).

In this manner, metadata indicating temporal positional information (timing information) concerning the sounding points and mute points of each musical instrument is provided for sound data. The use of such metadata makes it possible to obtain various timing information contained in the sound data.

B, C, and D in FIG. 2 merely indicate examples as metadata associated with the sound data indicated by A in FIG. 2. Metadata associated with sound data may be positional information in accordance with the tempo, chord progression, pitch, duration, beat of the sound data, structure information of a music piece, the type of musical instrument, or a volume change.

The structure information of a music piece includes information indicating lengths in accordance with a chord progression, an introduction part, A melody part, B melody part, a highlight part, an interlude part, a refrain part, or an ending part. Such structure information may be associated with the sound data to be played back. Information indicating time codes provided at regular intervals of the sound data may also be associated with the sound data.

As shown in FIG. 2, by associating metadata (B, C, and D in FIG. 2) indicating sounding points or mute points of each musical instrument forming the sound data (A in FIG. 2) with the sound data, computer graphic images can be generated and displayed in accordance with the playback operation of the sound data.

Figure 3:
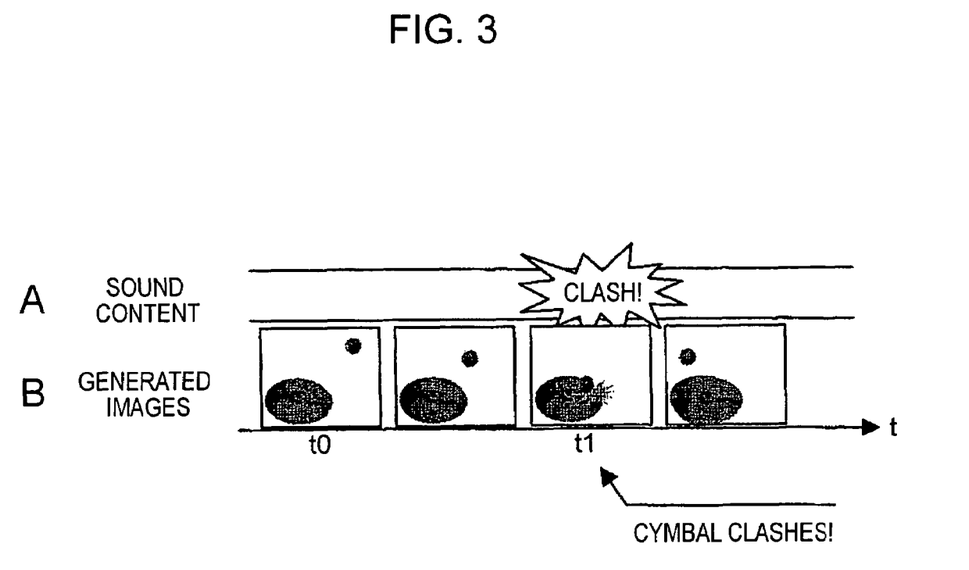
FIG. 3 illustrates an example of images generated and displayed in accordance with a playback operation of sound data.

FIG. 3 illustrates an example of computer graphic images generated and displayed in accordance with the playback operation of sound data. In FIG. 3, computer graphic images representing an event in which a ball passing while describing a parabola hits a cymbal are generated and displayed in synchronization with a cymbal sound played back at time t1 by playing back music content (sound data) indicated by A in FIG. 3. In this case, the processing for generating and displaying the computer graphic images is started at time t0, which is before time t1. Then, among a series of moving pictures represented by the computer graphic images, the picture of the ball hitting the cymbal can be displayed in synchronization with the cymbal sound played back at time t1.

As discussed above, in the recording/playback apparatus of this embodiment, when playing back sound data (original content data), metadata associated with the sound data is first read, and the processing for generating and displaying computer graphic images can be started at time t0, which is before time t1 when a certain portion of the sound data is played back, so that a certain picture of the computer graphic images can be synchronized with the certain portion of the sound data.

A specific description is given of processing for generating and displaying computer graphic images represented by moving pictures on the video display portion 24 in accordance with the playback operation of sound data stored in the recording medium 32 and output from the sound output portion 22.

Figure 4:
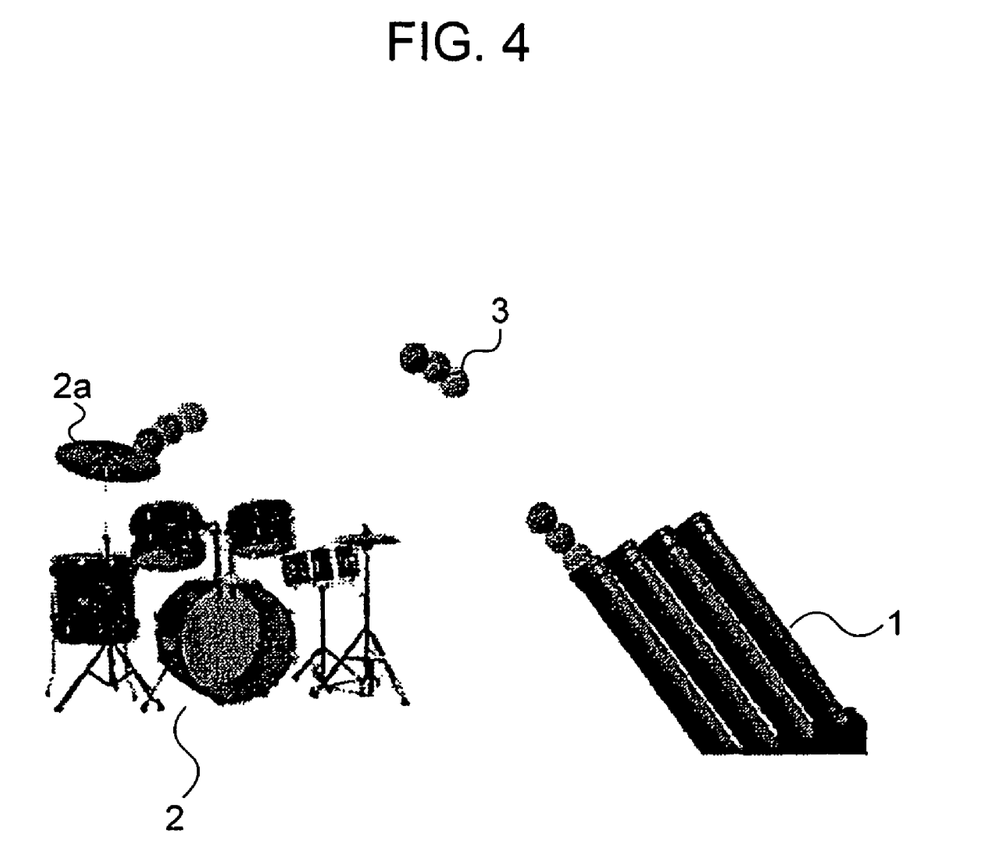
FIG. 4 illustrates an example of computer graphic images (moving pictures) generated in a controller and displayed on a display screen of a video display portion of the recording/playback apparatus in accordance with a playback operation of sound data.

FIG. 4 illustrates an example of computer graphic images (moving pictures) to be generated by the controller 10 of the recording/playback apparatus and to be displayed on the video display portion 24. In the computer graphic images shown in FIG. 4, a ball 3 is discharged from each pipe of a pipe unit 1 and hits the corresponding portion of a drum set 2. Such computer graphic images are generated and displayed in accordance with the playback operation of sound data.

In this case, it is important that a ball hits the target portion of the drum set 2 in synchronization with music to be played back. That is, the computer graphic images should be generated and displayed so that the ball 3 hits a cymbal 2a simultaneously with a clashing sound of the cymbal in the music read from the recording medium 32 and decoded in the decoder 21 and output from the sound output portion 22 under the control of the controller 10.

More specifically, the time required for causing the ball 3 to hit the cymbal 2a after being discharged from the pipe unit 1 is calculated from the positional relationship between the pipe unit 1 and the cymbal 2a and the initial speed and the discharging angle when the ball 3 is discharged. The ball 3 hits the cymbal 2a simultaneously with the clashing sound of the cymbal by discharging the ball 3 before the playback time of the cymbal sound by an amount equal to the calculated time. If the discharging angle of the pipe unit 1 is changed according to a predetermined rule every time the ball 3 is discharged, the initial speed is changed in response to a change in the discharging angle so that the ball 3 is caused to hit the cymbal 2a. In this case, although the time required for causing the ball 3 to hit the cymbal 2a varies, the ball 3 is discharged before the playback time of the cymbal sound by an amount equal to the changed required time.

Accordingly, by looking at the computer graphic images representing the movement of the ball 3 shown in FIG. 4 while listening to music generated by playing back the sound data, the user can feel as if the cymbal in music clashes because the ball 3 hits the cymbal 2a. In actuality, however, the computer graphic images are changing (moving) in accordance with the music being played back.

In this manner, by monitoring an event represented by computer graphic images in synchronization with the playback operation of sound data, a certain sensation (experience) can be produced in the user while listening to (seeing) content data. This kind of sensation is difficult to obtain when a user only listens to music or when an image generated (represented) according to a known method is displayed. The image generated according to a known method is, for example, an image generated based on a frequency analysis or a sound pressure analysis conducted in real time while music is being played back.

Figure 5:
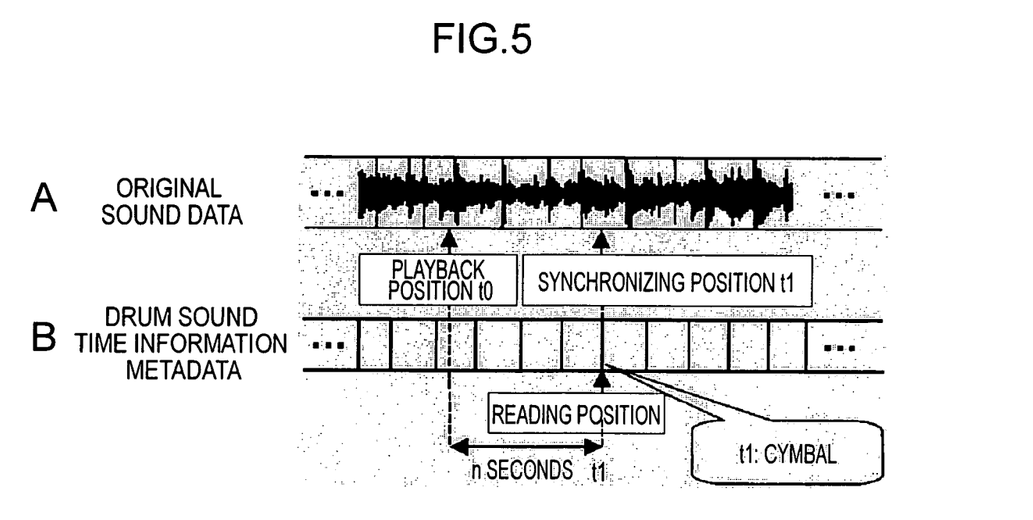
FIG. 5 illustrates the use of metadata associated with sound data to generate and display computer graphic images in accordance with a playback operation of sound data.

To generate and display computer graphic images in accordance with the playback operation of sound data, as described above, metadata associated with the sound data is used. FIG. 5 illustrates the use of metadata associated with the sound data to generate and display computer graphic images in accordance with the playback operation of the sound data.

When playing back original sound data as indicated by A in FIG. 5, the controller 10 simultaneously reads metadata including drum sound time information recorded on the recording medium 32 to specify the cymbal sounding time (synchronizing position) t1.

Then, as described with reference to FIG. 4, the controller 10 specifies the time n (seconds) from the start to the end of an event represented by computer graphic images. In this example shown in FIG. 4, in the moving pictures represented by the computer graphic images, the time n (seconds) required for causing the ball 3 to hit the cymbal 2a of the drum set 2 after being discharged from the pipe unit 1 is specified.

If the computer graphic images are generated according to a physical law, the time n can be specified by applying various conditions, such as the distance between the pipe unit 1 for discharging the ball 3 and the cymbal 2a of the drum set 2, the angle of the pipe unit 1, and the initial speed of the ball 3, to the physical law.

Even if the computer graphic images are not generated according to a physical law, the time n can be specified according to the processing performance of the controller 10 or the algorithms used for generating the computer graphic images.

Accordingly, the start position t0 at which the computer graphic images representing an event from when the ball 3 is discharged until when the ball 3 hits the cymbal 2a are generated can be specified as the time point before the synchronizing position t1 by n seconds. The synchronizing position t1 is the cymbal sounding point at which the image of the ball 3 hitting the cymbal 2a should be displayed in synchronization with the playback time of the sound.

As described above, metadata associated with sound data to be played back is read while playing back the sound data, and the position (value) of time t1 at which the ball 3 discharged from the pipe of the pipe unit 1 hits the cymbal 2a is obtained at least before t1-n (seconds), and the start time t0 at which computer graphic images representing an event in which the ball 3 is discharged from the pipe unit 1 and hits the cymbal 2a, as shown in FIG. 4, are generated is specified.

Then, while monitoring the progress of the decode processing on the sound data by the decoder 21, the controller 10 starts processing for generating and displaying the computer graphic images shown in FIG. 4 when the playback operation of the sound data reaches at playback time t0. That is, the playback time t0 of the sound data is a time point at which a predetermined event represented by computer graphic images is started (time point at which processing for generating and displaying target computer graphic images is started).

When the playback time of the sound data reaches the time t1, the playback sound including a cymbal sound is output from the sound output portion 22, and at the same time, computer graphic images representing a scene in which the flying ball 3 hits the cymbal 2a have been generated and displayed on the video display portion 24. Accordingly, the synchronizing position, i.e., time t1, is a time point at which the predetermined event represented by the computer graphic images is ended.

As stated above, computer graphic images to be displayed in accordance with the playback operation of sound data does not have to comply with a physical law, and thus, images that are infeasible in a real world can be represented. For example, images can be drawn according to a computer graphic technique so that the playback operation of sound data is started when a small object hits a string of a string instrument to start vibrations of the string, and is ended when a butterfly flying from somewhere draws up at a string to stop vibrations of the string.

As discussed above, the use of sound data and associated metadata makes it possible to identify when and which instrument sounds (or mutes). Accordingly, computer graphic images, such as those shown in FIG. 4, i.e., an event from which a ball is discharged to when the ball hits a cymbal, can be represented in real time in accordance with the playback operation of sound data. In the related art, computer graphic images have to be prepared and then inserted into content data later. That is, computer graphic images representing a target event can be generated and displayed in real time in accordance with the playback operation of sound data.

For the simplicity of description, in this example, a moving picture of a ball discharging from a pipe and hitting a cymbal is synchronized with the time point at which a cymbal sound is produced. However, the technique in the present invention is not restricted to such a simple representation.

In various music pieces, the individual instruments forming a drum set are beaten to produce a predetermined rhythm. Accordingly, metadata associated with the sound data of a music piece includes, as shown in FIG. 2, bus drum sounding time information, snare drum sounding time information, tom-tom drum sounding time information, high hat sounding time information, and cymbal sounding time information.

Accordingly, when generating computer graphic images shown in FIG. 4 in accordance with the playback operation of sound data of a music piece that produces a rhythm by a drum set, the following complicated computer graphic images can be generated and displayed. The time points at which computer graphic images representing an event in which balls are continuously discharged from the individual pipes of the pipe unit 1 to hit the individual instruments of the drum set 2 should be generated and displayed are determined based on the sounding times of the corresponding instruments of the drum set 2. Then, such computer graphic images are generated and displayed.

Additionally, information indicating which event is to be generated at which timing of sound data, for example, information indicating that an event represented by computer graphic images in which a flying ball hits a cymbal at a cymbal sounding time is generated and displayed, can be stored as the metadata in association with the sound data.

When playing back sound data, information indicating which event is to be generated at which timing of sound data may be received via the input interface 42 and is stored in the RAM 13. Then, based on the information, the end point of the predetermined event in relation to the sound data, the period from the start to the end of the predetermined event, and the start time of the predetermined event in relation to the sound data can be specified.

Information indicating which event is to be generated at which timing of sound data may be prepared for each sound data, or may be input from a user through the input interface 42 at a suitable time. Alternatively, such information may be provided from an external source at a suitable time, such as before or during the playback operation of the sound data, through the external interface 41, the digital interface 43, or the wireless interface 44.

In the above-described example, computer graphic images are generated and displayed in accordance with the playback operation of sound data. However, the present invention is not restricted to this example. It is possible to control a motion of a real object in accordance with the playback operation of sound data.

For example, in an amusement park, it is possible to control a real ball to be discharged from a pipe and to hit a target subject in accordance with the playback operation of sound data. When discharging a ball, the precise motion of the ball, i.e., the moving route or the time required for the ball to reach a target point, can be determined by calculating a parabola. Accordingly, the control start time can be easily calculated. It is thus possible to easily control a ball discharge device to cause the ball to hit a predetermined target subject (for example, a doll) in synchronization with a time at which the cymbal sound of the sound data is produced.

The ball discharge device includes a ball discharge mechanism and a controller having a CPU, a ROM, a RAM, etc. for controlling the ball discharge mechanism. The ball discharge device also includes, for example, a transmission/reception antenna and a communication interface to communicate with the recording/playback apparatus shown in FIG. 1 via the wireless interface 44 and the transmission/reception antenna 45.

Upon receiving an operational instruction from the recording/playback apparatus of this embodiment, the ball discharge device configured as described above can start discharging a ball before the time at which the cymbal sound is produced from the sound output portion 22 of the recording/playback apparatus and causes the ball to hit the target subject in synchronization with the cymbal sounding time.

The motion of an object is not restricted to the discharging of a ball, and may be any motion of an object as long as the physical quantity of the motion can be determined by physical calculation. Then, the time required for completing a target event, such as the time required for causing an object to hit a target subject, can be determined. Thus, various events occurring by using various objects can be controlled in an embodiment of the present invention.

In recent years, pet robots simulating dogs or cats or humanoid robots (hereinafter collectively referred to as "pet robots") are being used at home. The pet robots have diversified functions, such as a function of taking complicated action in response to user's voice, and are recognized as new household electric appliances.

A pet robot includes drive mechanisms for driving individual elements, such as hands, feet, neck, eyes, mouth, and tail, and a controller having a CPU, a ROM, a RAM, etc. for controlling the drive mechanisms. According to an embodiment of the present invention, the driving of the above-described pet robot can be controlled in accordance with the playback operation of sound data.

To control the pet robot by the recording/playback apparatus of this embodiment, the pet robot is provided with a transmission/reception antenna and a wireless interface to communicate with the recording/playback apparatus shown in FIG. 1 via the transmission/reception antenna 45 and the wireless interface 44. Then, the controller of the pet robot can control the drive mechanisms in response to control information sent from the recording/playback apparatus by wireless communication.

It is now assumed that, when playing back sound data recorded on the recording medium 32 of the recording playback apparatus shown in FIG. 1, the pet robot is caused to jump in response to a cymbal sound of the sound data. In this case, the pet robot jumps, for example, by stretching itself from a posture "down".

The controller 10 of the recording/playback apparatus first reads metadata associated with the sound data to be played back to specify the cymbal sounding time t1, as stated above. The controller 10 also communicates with the pet robot to obtain the time n from the start to the end of a series of actions including a jumping action.

In this case, information concerning the time n, i.e., the time from the start to the end of a major action, is registered in advance in a memory contained in the pet robot, and such information is sent from the pet robot to the recording/playback apparatus by wireless communication.

Then, the controller 10 specifies the time point before the cymbal sounding time t1 of the sound data by the time n as the operation start time t0. When the playback time point of the sound data reaches the operation start time t0, the controller 10 sends a jumping instruction to the pet robot via the wireless interface 44 and the transmission/reception antenna 45.

Upon receiving the jumping instruction from the recording/playback apparatus, the controller of the pet robot controls the drive mechanisms to cause the pet robot to start a jumping action by stretching itself from a posture "down" and to complete the jumping action at a time when the cymbal sound is produced from the sound output portion 22 of the recording/playback apparatus.

With this operation, the user can feel as if the cymbal sounds in response to the action of the pet robot, i.e., the pet robot operated subjectively and autonomously.

As discussed above, displaying moving pictures can be controlled in accordance with the playback operation of sound data, or a physical motion of an object can be controlled in accordance with the playback operation of sound data. Similarly, playing back sub-sound data may be controlled in accordance with the playback operation of main sound data.

For example, it is now assumed that there is sound data indicating a series of sounds "CREAK, SLAM" produced when an opened door starts moving and is closed by wind at a predetermined speed. In this case, a series of events from the start of the door to the closing of the door can be represented by a creaking sound "CREAK" of a door hinge continuing from when the door starts moving until immediately before the door is closed and by a slamming sound "SLAM" when the door is closed.

Then, the sounds "CREAK, SLAM" from the start of the movement of the door until the closing of the door are played back in accordance with the playback operation of main sound data. In this case, it is desired that the sound "SLAM" indicating the closing of the door be produced at the end of a song of a music piece produced by playing back the main sound data.

In this case, metadata associated with the main sound data is first read to specify the position t1 at which the music piece is ended, the time from the start to the end of the sounds "CREAK, SLAM", which is a series of sounds from the start of the door to the closing of the door, and more precisely, the time n from the start of the sound "CREAK" to the start of the sound "SLAM".

Then, when the playback time of the main sound data reaches the time position t0, the playback operation of a series of sounds "CREAK, SLAM" from the start of the door to the closing of the door is started. This allows a series of sounds from the start of the door to the closing of the door to be produced at the end of the music piece. That is, a slamming sound "SLAM" can be produced in synchronization with the end of the music piece.

In this manner, when playing back sub-sound data in accordance with the playback operation of main sound data, sound to be controlled is not sporadic sounds, but a series of sounds from the start to the end of a certain event are played back and the playback timing of such a series of sounds are controlled in synchronization with the predetermined playback timing of main sound data.

In the above-described example, the playback timing of sub-sound data is controlled in accordance with the playback timing of main sound data. However, the playback operation of sound data may be controlled so that a predetermined sound of the sound data can be produced in synchronization with the movement of a door represented by computer graphic images. Additionally, this technique may be applied to a real door. That is, the playback operation of sound data may be controlled so that a predetermined sound of the sound data is produced in synchronization with the closing of a real door.

Figure 6:
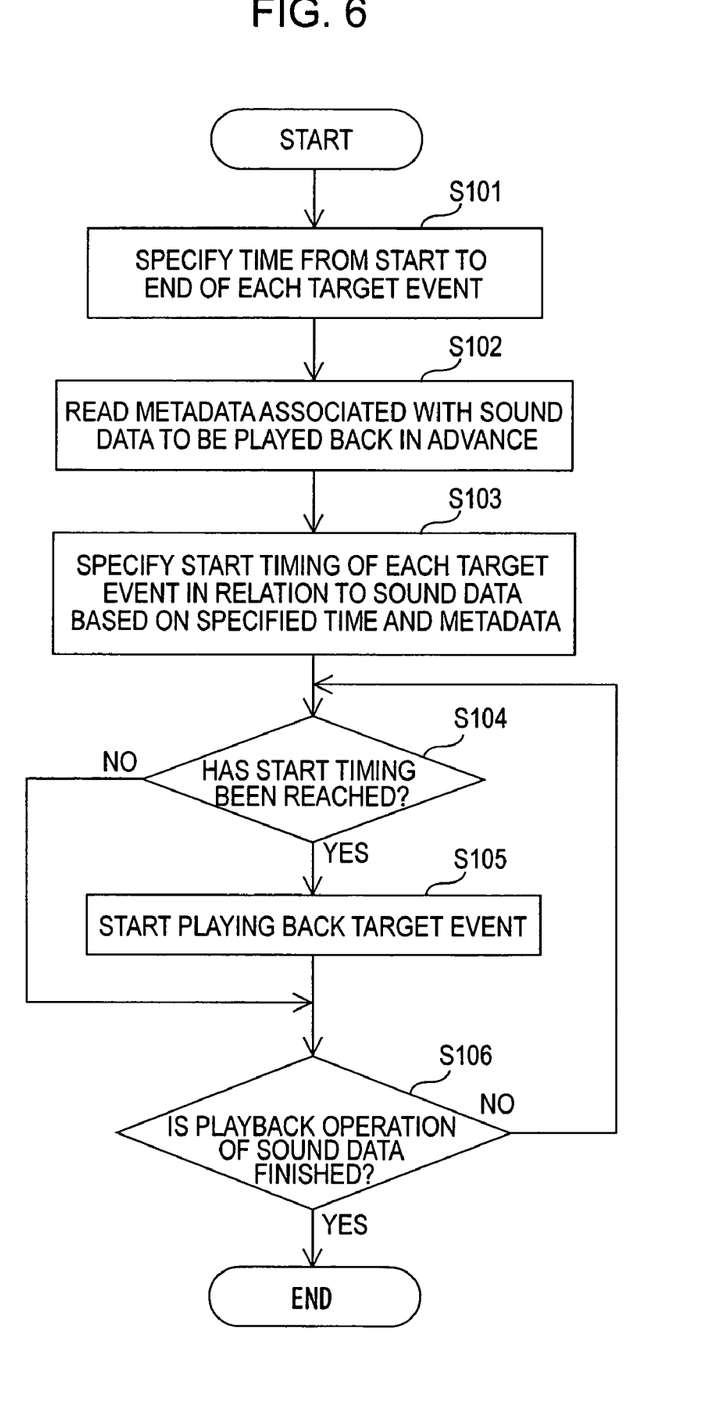
FIG. 6 is a flowchart illustrating processing for executing various control operations, such as a display control operation for moving pictures, in accordance with a playback operation of sound data performed in the recording/playback apparatus.

A description is now given, with reference to the flowchart in FIG. 6, of processing for executing various control operations, such as a display control operation for moving pictures, in accordance with the playback operation of sound data in the recording/playback apparatus of this embodiment. The processing shown in FIG. 6 is started in the controller 10 of the recording/playback apparatus when control should be executed in accordance with the playback operation of sound data.

In response to an instruction to control, in accordance with a playback operation of sound data, the generation and display of computer graphic images, a physical motion of an object, or a playback operation of another sound data, the controller 10 executes the processing shown in FIG. 6.

In step S101, the controller 10 specifies time from the start to the end of each target event to be controlled. More specifically, in step S101, as described above, if computer graphic images of predetermined moving pictures are displayed in accordance with the playback operation of sound data, the time from the start to the end of an event (moving pictures from when a ball is discharged from a pipe to when the ball hits a cymbal) represented by the computer graphic images is specified.

Similarly, if a motion of a real object is controlled in accordance with the playback operation of sound data, the time from the start to the end of a predetermined motion of the object (motion from when a ball is discharged from a pipe to when the ball hits a cymbal) is specified. If, in accordance with the playback operation of sound data, the playback operation of another sound data is controlled, the time from the start to the end of a series of sounds played back by another sound data is specified.

In step S102, the controller 10 reads metadata associated with the sound data to be played back. Then, in step S103, the controller 10 specifies the start timing of the target event based on the time from the start to the end of the event specified in step S101 and the metadata read in step S102.

That is, as stated above, in step S103, the end position t1 of the target event, such as the cymbal sounding time in the sound data to be played back, is specified based on the metadata, and the time n specified in step S101 is subtracted from the end position t1 to specify the start position t0 of the target event.

If there are a plurality of target events, the time from the start to the end of each of the target events is specified in step S101, and the start timing of each target event is specified in step S103.

The start timing of each target event specified in step S103 is managed in the RAM 13 of the controller 10. Then, by monitoring the playback status of the sound data, the controller 10 determines in step S104 whether the start timing of a certain event has been reached. If the controller 10 determines in step S104 that the start timing of a certain event has been reached, the process proceeds to step S105 in which the playback operation of that event is started.

In step S105, if the target event is to generate and display computer graphic images, processing for generating and displaying such computer graphic images is started, and the target event represented by the computer graphic images is ended in synchronization with a predetermined sound of the sound data.

The controller 10 then determines in step S106 whether the playback operation of the sound data is finished. If the controller 10 determines that the playback operation of the sound data is not finished, the process returns to step S104. If the controller 10 determines that the playback operation of the sound data is finished, the processing is completed.

As described above, in accordance with the playback operation of sound data, the playback operation of another sound data, the generation and display of computer graphic images, or a physical motion of an object, which has to be prepared before the playback time of the sound data in the related art, can be controlled. Accordingly, the sound producing timing of another sound data, the generation and display of the computer graphic images, or the physical motion of an object can be synchronized with a predetermined position of the sound data. As a result, new entertainment using sound data can be provided.

If a target event is represented by computer graphic images, a series of events, which are difficult to be represented by a visualizer for generating information only from a sound signal for a short time around the playback time position or by a moving toy which moves in accordance with music, can be represented, thereby providing diversified, interesting representations to the user.

In step S103, the start timing of the target event is specified based on the time from the start to the end of the event specified in step S101 and the metadata read in step S102. However, offsets may suitably be added. For example, if a device to be controlled is away from the recording/playback apparatus, the start timing may be set earlier in consideration of a time for sending and receiving control signals. Conversely, if the processing performance of the recording/playback apparatus is high, the start timing may be set later.

The order of step S101 and step S102 may be reversed.

In the above-described embodiment, in accordance with the playback operation of sound data recorded on the recording medium 32, the display of moving pictures, a physical motion of an object, or the playback operation of another sound data is controlled. Alternatively, in accordance with the playback operation of various video content data, such as movies, dramas, or moving pictures created by computer graphic images, a physical motion of an object, the playback operation of sound data, or the display of other moving pictures on another display device may be controlled.

That is, video content data, such as video pictures or television dramas, can be recorded on the recording medium 32 shown in FIG. 1, and in accordance with the playback operation of the video content data recorded on the recording medium 32, representations of various events can be controlled. In this case, metadata including positional information indicating target positions, such as start points and end points of target scenes, scene change points, and cut change points, is associated with each video content data recorded on the recording medium 32.

While playing back the video content data via the controller 10 and the video decoder 23 and displaying the content data on the video display portion 24, the controller 10 reads the metadata associated with the video data from the recording medium 32 via the interface 31. The controller 10 then specifies the start timing t1 of a target scene based on the read metadata, and controls the start timing of a target event so that the event can be ended at the start timing t1 of the target scene.

For example, when playing back movie content stored in the recording medium 32, a pet robot is controlled to jump in synchronization with the playback timing of an explosion scene of that movie.

If the recording/playback apparatus shown in FIG. 1 is used, for example, in a mini theater in an amusement park, it is connected to a door control device in the mini theater by, for example, wireless communication, and when playing back movie content in the recording/playback apparatus, the door control device can be controlled to shut the door in synchronization with a horror scene of that movie.

When playing back video content, a series of sounds are started before the start timing of a predetermined scene, and the series of sounds are ended in synchronization with the start timing of the predetermined scene. Alternatively, the recording/playback apparatus of this embodiment may be connected to another video display device by wireless communication. Then, when playing back video content in the recording/playback apparatus, processing for generating and displaying computer graphic images representing a predetermined event is started before the start timing of a predetermined scene, and generation and displaying the computer graphic images is controlled so that the event represented by the computer graphic images can be ended at the start timing of the predetermined scene.

In accordance with the playback operation of various video content data, a physical motion of an object, the playback operation of sound data, or the display of other moving pictures on another display device can be controlled. With this operation, instead of simply providing content data only, video content can be provided to users in a new mode.

As discussed above, when main content data to be played back is video data, metadata corresponding to time information concerning the video data is prepared, and meaningful information, such as a video section in which a specific actor appears or the moment of an explosion scene, is included in the metadata together with the time information. If content is music data with images, metadata similar to music content can be provided and used.

Alternatively, if content to be played back is a physical operation of an object, in accordance with the physical motion of the object, the playback operation of sound data, the display of moving pictures, or a physical motion of another object may be controlled. For example, if content to be played back is a motion of the above-described pet robot, in accordance with a jumping action of the pet robot, a series of sound data may be played back before the end of the jumping action.

Similarly, in accordance with the jumping action of the pet robot, a series of moving picture data may be generated and displayed before the end of the jumping action. Alternatively, in accordance with the jumping action of the pet robot, a motion of another object, for example, discharging a ball, may be associated with the jumping action and be controlled.

As described above, according to an embodiment of the present invention, in accordance with the playback operation of main content data to be played back, various target events requiring a certain period to finish can be created and presented to users. In this case, target events to be created can be various subjects, such as those represented by pictures, sound, objects, without being restricted.

As stated above, by reading metadata associated with main content data, such as sound data, before the content data, processing for generating and controlling another content data can be started theoretically at any time earlier than the playback time of the main content.

As stated above, since various metadata associated with main content data include temporal positional information concerning the content data, the target positions of the content data to be played back can be precisely specified.

As discussed above, content data and associated metadata may be received via another recording medium, for example, a semiconductor memory, a magnetic recording medium, an optical recording medium, or may be received from another computer via a network.

In response to the playback operation of main content, another content can be changed in real time by using the metadata associated with the main content data. That is, in response to the playback operation of the main content data, it is not necessary that another content data be changed in advance before the playback operation of the main content.

In the above-described embodiment, metadata associated with content data to be played back may be provided together with or independently of the main content data. Alternatively, metadata may be automatically generated by analyzing content data.

If content data is sound data, delimiting data, such as beat, tempo, bars, or sounding points or sounding sections of predetermined musical instruments, can be automatically generated and used as metadata by analyzing the sound data. If content data is video data, delimiting positions, such as scene change points or cut change points, can be specified according to, for example, an image recognition technique, and can be used as metadata.

According to the foregoing embodiment, by using metadata associated with sound data or video data, which is main content data to be played back, before playing back the sound data or the video data, the playback operation of sound data or video data, which is different from the main content data, or a physical motion of an object is started, and the operation of the sound data, video data, or motion of an object is ended in synchronization with a certain playback position of the main content data. However, the present invention is not restricted to this pattern.

For example, at a target position before or after the playback position of sound data or video data, another sound data, video data, motion of an object may be ended. That is, the end position of an event representing the operation of sound, video, object may be displaced from the end position of the main content data specified by the metadata.

Various types of formats can be used for content data, such as sound data, video data, or AV data. For example, as sound data, musical instrument digital interface (MIDI) data may be used so that sound data itself can contain metadata. Content data may be compressed data using various data compression methods.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus for controlling an event represented by at least one of a sound, an image, or a motion of an object in accordance with a playback operation of playback data, the apparatus comprising:

playback processing means for performing playback processing on the playback data;

acquisition means for acquiring playback section information for specifying a target playback section of the playback data, the playback section information being provided in association with the playback data;

end time point specifying means for specifying an end time point of the event in relation to the playback data based on the playback section information acquired by the acquisition means;

time period specifying means for specifying a time period from a start to an end of the event;

start time point specifying means for specifying a start time point of the event based on the end time point specified by the end time point specifying means and the time period from the start to the end of the event specified by the time period specifying means; and control means for controlling the event to be started at the start time point of the event specified by the start time point specifying means and to be ended at the end time point of the event in synchronization with the target playback section by monitoring a playback status of the playback data, wherein the event is generated during reproduction of the playback data.

2. The control apparatus according to claim 1, wherein the playback data is sound data, and the playback section information is based on at least one of a tempo, a chord progression, a pitch, a duration, a beat, structure information concerning a music piece, a type of musical instrument, and a change in a volume of the sound data.

3. The control apparatus according to claim 2, wherein the structure information includes time information concerning at least one of a repeat pattern, an introduction part, a highlight part, an A melody part, a B melody part, and a refrain part of the sound data.

4. The control apparatus according to claim 1, wherein the playback data is video data, and the playback section information includes at least one of scene change points of the video data, cut change points of the video data, and a start point and/or an end point of a target scene of the video data.

5. The control apparatus according to claim 1, wherein the acquisition means acquires the playback section information concerning a section temporally later than the playback processing by the playback processing means.

6. The control apparatus according to claim 1, wherein the playback section information is acquired from a source different from a source of the playback data.

7. The control apparatus according to claim 6, wherein the playback section information includes an identifier for specifying corresponding playback data.

8. The control apparatus according to claim 1, wherein the acquisition means acquires the playback section information for specifying the target playback section of the playback data from a metadata associated with the playback data, and the event is generated during the reproduction of the playback data by reading the metadata during the reproduction.

9. A control apparatus for controlling an event represented by at least one of sound, an image, and a motion of an object in accordance with an operation status of a target object, the apparatus comprising:

drive means for driving the target object;

acquisition means for acquiring operation section information for specifying a target operation section of the target object, the operation section information being provided in association with a series of operations of the target object;

end time point specifying means for specifying an end time point of the event in relation to the series of operations of the target object based on the operation section information acquired by the acquisition means;

time period specifying means for specifying a time period from a start to an end of the event;

start time point specifying means for specifying a start time point of the event based on the end time point specified by the end time point specifying means and the time period from the start to the end of the event specified by the time period specifying means; and control means for controlling the event to be started at the start time point specified by the start time point specifying means by monitoring the operation status of the target object, wherein the end time point of the event in synchronized with the target operation section.

10. The control apparatus according to claim 8, wherein the acquisition means acquires the operation section information concerning a section temporally later than actual drive processing for driving the target object by the drive means.

11. The control apparatus according to claim 8, wherein the operation section information is acquired from a source different from a source of control information for the target object.

12. The control apparatus according to claim 11, wherein the operation section information includes an identifier for specifying the control information concerning the operation of the target object.

13. A control method for controlling an event represented by at least one of sound, an image, or a motion of an object in accordance with a playback operation of playback data, the method comprising the steps of:

performing playback processing on the playback data;

acquiring playback section information for specifying a target playback section of the playback data, the playback section information being provided in association with the playback data;

specifying an end time point of the event in relation to the playback data based on the acquired playback section information;

specifying a time period from a start to an end of the event;

specifying a start time point of the event based on the specified end time point and the specified time period from the start to the end of the event; and controlling the event to be started at the specified start time point of the event and to be ended at the end time point in synchronization with the target playback section.

14. The control method according to claim 13, wherein the target event is represented by the image, the playback data comprises sound data and displaying the image ends in synchronization with a predetermined sound of the sound data.

15. The control method according to claim 14, wherein the playback section information comprises information on a start time point and an end time point of performance of a predetermined musical instrument and the event visualizes the performance of the predetermined musical instrument.

16. A control method for controlling an event represented by at least one of sound, an image, and a motion of an object in accordance with an operation status of a target object, the method comprising steps of:

driving, via at least one processor, the target object;

acquiring operation section information for specifying a target operation section of the target object, the operation section information being provided in association with a series of operations of the target object;

specifying an end time point of the event in relation to the series of operations of the target object based on the acquired operation section information;

specifying a time period from a start to an end of the event;

specifying a start time point of the event based on the specified end time point and the specified time period from the start to the end of the event; and controlling, via a processor, the event to be started at the specified start time point and to be ended at the end time point that in synchronization with the target operation section by monitoring the operation status of the target object.

17. A control apparatus for controlling an event represented by at least one of sound, an image, or a motion of an object in accordance with a playback operation of playback data, the apparatus comprising:

a playback processor operable to perform playback processing on the playback data;

an acquisition unit operable to acquire playback section information for specifying a target playback section of the playback data, the playback section information being provided in association with the playback data;

an end time point specifying unit operable to specify an end time point of the event in relation to the playback data based on the playback section information acquired by the acquisition unit;

a time period specifying unit operable to specify a time period from a start to an end of the event;

a start time point specifying unit operable to specify a start time point of the event based on the end time point specified by the end time point specifying unit and the time period from the start to the end of the event specified by the time period specifying unit; and a controller operable to control the event to be started at the start time point of the event specified by the start time point specifying unit and to be ended at the end time point in synchronization with the target playback section by monitoring a playback status of the playback data.

18. The control apparatus according to claim 17, wherein the playback data comprises a video content data, the target playback section comprises a target scene, and the event is ended at a start of the target scene.

19. A control apparatus for controlling an event represented by at least one of sound, an image, and a motion of an object in accordance with an operation status of a target object, the apparatus comprising:

a drive unit operable to drive the target object;

an acquisition unit operable to acquire operation section information for specifying a target operation section of the target object, the operation section information being provided in association with a series of operations of the target object;

an end time point specifying unit operable to specify an end time point of the event in relation to the series of operations of the target object based on the operation section information acquired by the acquisition unit;

a time period specifying unit operable to specify a time period from a start to an end of the event;

a start time point specifying unit operable to specify a start time point of the event based on the end time point specified by the end time point specifying unit and the time period from the start to the end of the event specified by the time period specifying unit; and a control unit operable to control the event to be started at the start time point specified by the start time point specifying unit and to be ended at the end time point in synchronization with the target operation section by monitoring the operation status of the target object.

* * * * *